United States Patent
Bertero et al.

(10) Patent No.: US 6,893,748 B2
(45) Date of Patent: May 17, 2005

(54) SOFT MAGNETIC FILM FOR PERPENDICULAR RECORDING DISK

(75) Inventors: Gerardo Bertero, Redwood City, CA (US); David Wachenschwanz, Saratoga, CA (US); Sudhir Malhotra, Fremont, CA (US); Emur M. Velu, Fremont, CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 10/442,756

(22) Filed: May 20, 2003

(65) Prior Publication Data

US 2005/0008902 A1 Jan. 13, 2005

(51) Int. Cl.[7] .............................. G11B 5/66; G11B 5/70; B05D 5/12
(52) U.S. Cl. ..................... 428/694 TM; 428/694 TS; 428/212; 428/336; 428/900; 427/130; 427/131
(58) Field of Search .................... 428/694 TS, 694 TM, 428/336, 212, 900; 427/130, 131

(56) References Cited

U.S. PATENT DOCUMENTS

| | | | |
|---|---|---|---|
| 3,973,920 A | 8/1976 | Tadokoro et al. | |
| 5,834,085 A | 11/1998 | Lairson et al. | |
| 6,261,681 B1 | 7/2001 | Suekane et al. | |
| 6,270,885 B1 * | 8/2001 | Hokkyo et al. | 428/332 |
| 6,469,878 B1 | 10/2002 | Mack et al. | |
| 6,641,935 B1 * | 11/2003 | Li et al. | 428/694 TS |
| 6,645,614 B1 * | 11/2003 | Girt et al. | 428/336 |
| 6,686,070 B1 * | 2/2004 | Futamoto et al. | 428/694 TS |
| 2002/0186488 A1 | 12/2002 | Nishikawa et al. | |
| 2003/0022023 A1 * | 1/2003 | Carey et al. | 428/694 MM |
| 2003/0044649 A1 | 3/2003 | Takizawa et al. | |

* cited by examiner

Primary Examiner—Holly Rickman
(74) Attorney, Agent, or Firm—Blakely Sokoloff Taylor & Zafman LLP (57) ABSTRACT

A perpendicular magnetic recording disk having a soft magnetic film disposed between a substrate and a magnetic recording layer. The soft magnetic film includes a soft magnetic underlayer and one or more layer groups having a spacer layer and a soft magnetic layer disposed above the spacer layer in each layer group. The spacer layers induce anti-ferromagnetic coupling between the surrounding ferromagnetic layers. The spacer layers may be comprised of ruthenium. The soft magnetic layers may have a granular decoupled structured through the use of a segregate.

22 Claims, 9 Drawing Sheets

SOFT MAGNETIC FILM FOR PERPENDICULAR RECORDING DISK

TECHNICAL FIELD

This invention relates to the field of disk drives and more specifically, to perpendicular magnetic recording disks used in disk drives.

BACKGROUND

The trend in the design of magnetic hard disk drives is to increase the recording density of a disk drive system. Recording density is a measure of the amount of data that may be stored in a given area of a disk. Current disk drive products use longitudinal magnetic recording technology. Longitudinal magnetic recording is reaching limitations as the areal density is increased. One such limitation is in regards to the width of the recording transitions. Another such limitation is thermal stability of the recorded magnetization transitions. The width of a magnetization transition in longitudinal recording is proportional to the magnetic moment density, MrT, (where Mr is the remanent magnetization measured in units of magnetic moment per unit of volume, e.g., emu/cm3, and T is the film thickness, measured in units of length, e.g., cm) and inversely proportional to the magnetic coercivity, Hc, of the media. Thermal stability of the media is improved by increasing its MrT and its Hc. Large transitions widths limit the storage capacity of the system by limiting the number of magnetization transitions that can be resolved per length of track recorded. Thus, the tendency in the industry has been to increase Hc and lower MrT to achieve better resolution as areal density increased. However, the maximum value of Hc allowable is bounded by the writing head magnetic field strength and the minimum value of MrT allowable is bounded by thermal stability requirements. One solution to reduce the transition region in the magnetic recording layer of a longitudinal magnetic recording disk is to invoke synthetic antiferromagnetic (SAF) structures. SAF structures dispose a Ruthenium (Ru) interlayer between two hard magnetic recording layers. The Ru interlayer induces anti-ferromagnetic coupling between the hard magnetic recording layers. This antiferromagnetic coupling allows for the use of lower effective MrTs while at the same time keeping the transitions thermally stable. This effective reduction of MrT reduces the length of the transition region and improves PW50 (the pulse width where the read head output amplitude, in response to an isolated transition, is 50% of the peak level).

Figure 1A:
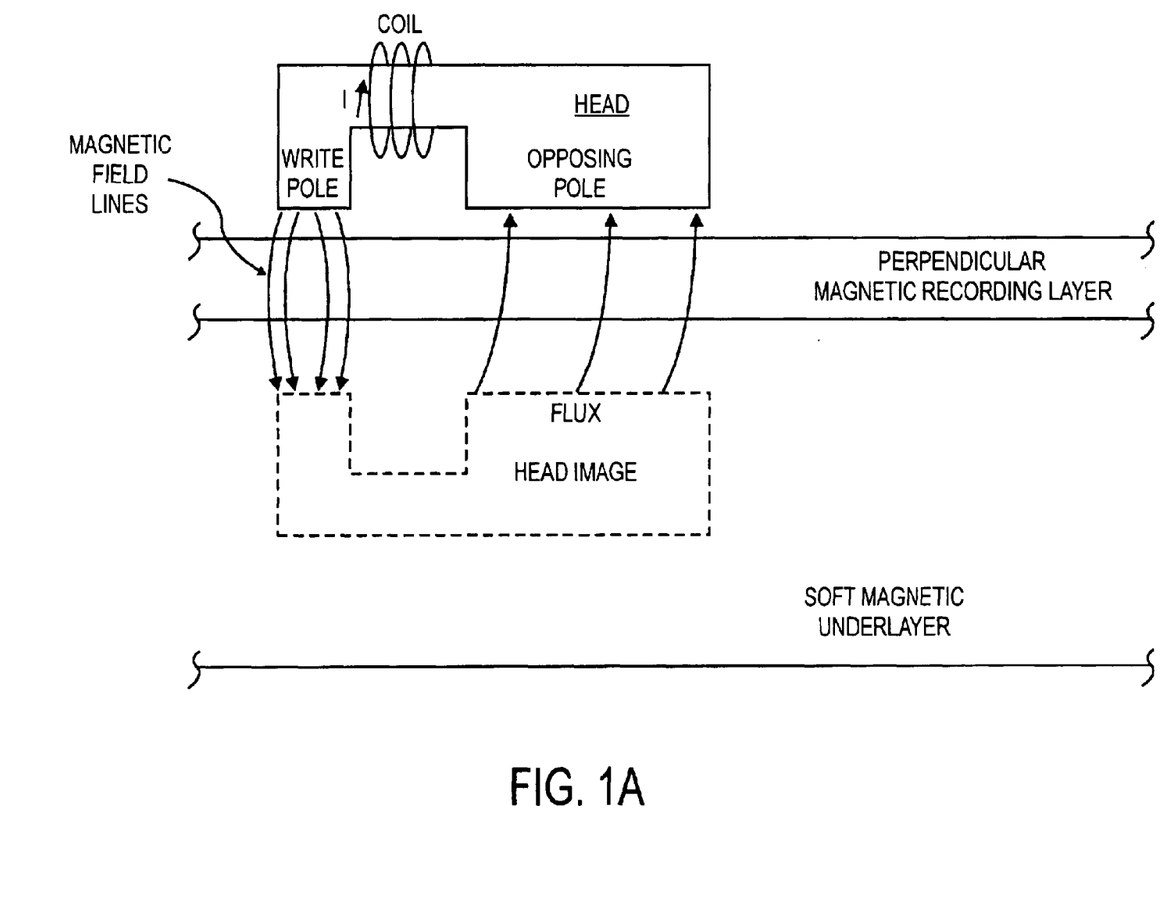
FIG. 1A illustrates a conventional perpendicular recording disk drive system.

Perpendicular magnetic recording systems have been developed to achieve higher recording density than may be possible with longitudinal magnetic recording systems. FIG. 1A illustrates portions of a conventional perpendicular magnetic recording disk drive system. The disk drive system has a recording head that includes a trailing write pole, a leading return (opposing pole) magnetically coupled to the write pole, and an electrically conductive magnetizing coil surrounding the yoke of the write pole. The bottom of the opposing pole has a surface area greatly exceeding the surface area of the tip of the write pole. To write to the magnetic recording media, the recording head is separated from the magnetic recording media by a distance known as the flying height. The magnetic recording media is rotated past the recording head so that the recording head follows the tracks of the magnetic recording media, with the magnetic recording media first passing under the opposing pole and then passing under the write pole. Current is passed through the coil to create magnetic flux within the write pole. The magnetic flux passes from the write pole, through the disk, and across to the opposing pole. Conventional perpendicular recording disks typically includes a hard magnetic recording layer in which data are recorded, and a soft magnetic underlayer. The soft magnetic layer enables the magnetic flux from the trailing write pole to return to the leading opposing pole of the head with low impedance, as illustrated by the head image of FIG. 1A.

Figure 1B:
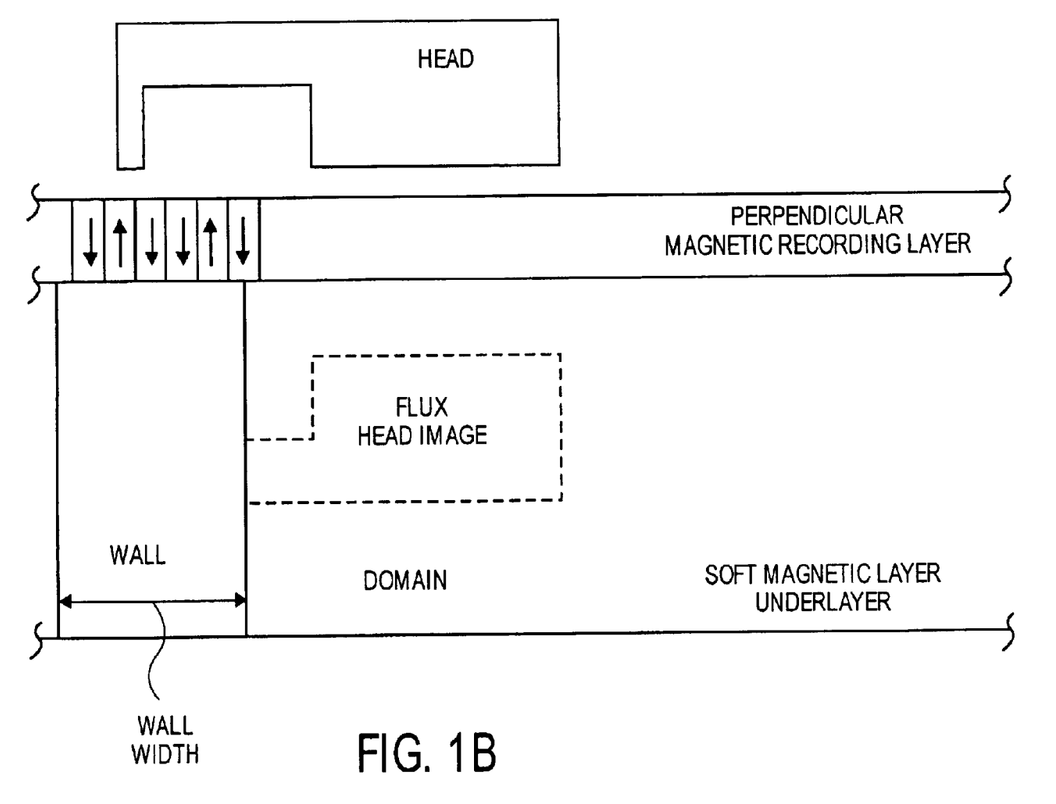
FIG. 1B illustrates domain wall effects in a conventional perpendicular recording disk drive system.

Perpendicular recording disks should have much narrower PW50 than is currently observed in longitudinal recording disks because in a perpendicular recording layer all of the magnetic easy axes are aligned in the perpendicular direction, i.e. the direction of recording. With this perpendicular recording type of media, a soft magnetic underlayer (SUL) is intended to serve as a flux concentrator to provide a sharp head field gradient so that narrow transitions can be written. One problem with current perpendicular magnetic recording disks is that the soft magnetic underlayer, contains magnetic structures that are fully exchange coupled. As such, any magnetization transition present in the soft magnetic underlayer will be at least as broad as a typical domain wall width (e.g., 100 to 500 nm), illustrated in FIG. 1B. Also, the presence of such a domain wall will reduce the local permeability of the SUL and may influence the structure to act as if no soft underlayer material were present in that region to provide a low impedance flux path. A large width of the domain walls acts to degrade the sharpness of the head gradient and limit the value of PW50. This is a problem because sharp head field gradients are needed to write narrow transitions in the perpendicular magnetic recording films. Another problem with domain walls present in the SUL is the field that they project. When the read head passes directly over the media where a domain transition is present in the SUL, it will pick up a corresponding low frequency signal that adds to the noise of the system thus degrading overall performance.

One solution for the transition width problem is to exchange decouple grains in the soft underlayer material. The decoupling can be achieved by adding a material such as silicon dioxide ($SiO_2$) in the soft underlayer material in order to segregate the SiO2 to the grain boundaries and break the ferromagnetic coupling between SUL grains. A reduction in exchange coupling between the soft magnetic grains allows magnetic transitions to exist closer together in the recording medium, resulting in greater data storage density. One problem with only adding a segregate to the soft underlayer material is that it may exhibit less permeability and higher coercivity (Hc) than is typical of soft magnetic materials. In addition, even when inter-granular exchange coupling is broken, the transitions in the soft magnetic underlayer may still be wide due to magnetostatic coupling (the magnetic coupling of individual magnetic dipoles in absence of a magnetic field). This is particularly the case (wide transitions) because of the high moment and thickness and low Hc characteristic of these SUL films.

The extent of the magnetostatic coupling can in turn be effectively reduced in the SUL by invoking appropriate synthetic antiferromagnetic structures which in remanence (i.e., in the absence of an external applied field) minimize the net moment available for long range coupling. With an effectively reduced magnetic moment and, in the presence of low intergranular exchange, the length of the transitions can be made significantly smaller. Furthermore, special design of the structure can be achieved that also reduces considerably the amount of field projected away from the transition, thus minimizing the deleterious influence of the eddy fields from the SUL on the read head.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details are set forth such as examples of specific materials, components, dimensions, etc. in order to provide a thorough understanding of the present invention. It will be apparent, however, to one skilled in the art that these specific details need not be employed to practice the present invention. In other instances, well-known components or methods have not been described in detail in order to avoid unnecessarily obscuring the present invention.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers. Further the term "underlayer" is used herein to refer to a position relative to the magnetic recording layer. As such, there may be one or more other layer(s) disposed between the underlayer and the magnetic recording layer.

"Hard" or "soft" media can make up the layers in a perpendicular magnetic recording disk. A hard magnetic recording layer, acting as the data layer, requires large applied fields to become permanently magnetized in a specific direction and once magnetized in such a manner, large fields are required to reverse the magnetization and/or erase the recorded information. A soft magnetic layer, on the other hand, requires relatively low fields to become magnetized in a specific direction. Materials providing a soft magnetic layer may be used in conjunction with a hard magnetic layer to achieve improved performance as discussed below.

A perpendicular magnetic recording disk is described. The perpendicular magnetic recording disk is used in a disk drive system that typically includes a read-write head. The head includes a trailing write pole, a leading return (opposing pole) magnetically coupled to the write pole. A magnetically soft film underneath a hard magnetic recording layer is used in order to form a magnetic circuit with the head. The soft magnetic film provides a path for magnetic flux that flows to or from the head. The soft magnetic film includes a soft magnetic underlayer and one or more layer groups having a spacer layer and a soft magnetic layer disposed above the spacer layer in each layer group. The spacer layers induce anti-ferromagnetic coupling between the surrounding ferromagnetic layers. The spacer layers may be comprised of ruthenium. The soft magnetic layers may have a granular decoupled structured through the use of a segregate.

Figure 2:
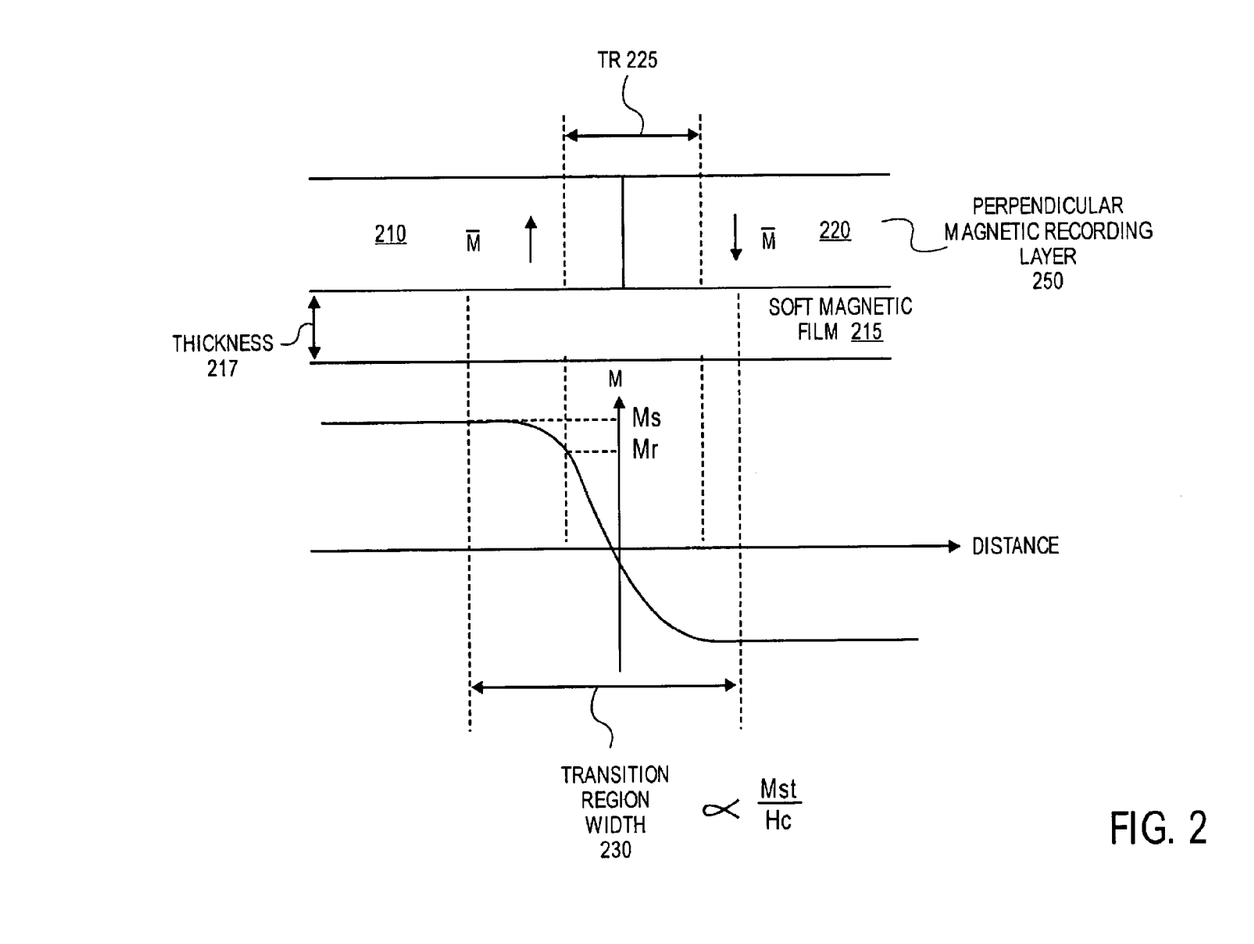
FIG. 2 illustrates magnetizations of regions in a perpendicular magnetic recording layer.

FIG. 2 illustrates magnetizations of regions in a perpendicular magnetic recording layer. Region 210 of perpendicular magnetic recording layer 250 is magnetized in a first direction and region 220 is magnetized in a second direction opposite the first direction. A transition region in the magnetic recording layer ($TR_H$) 225 exists between the oppositely aligned magnetization regions 210 and 220 of the magnetic recording layer 250. This is the region where the magnetization reverses polarity between recording bits. In magnetic recording, it is desirable for the $TR_H$ 225 to be as small as possible in order to maximize areal recording density. Soft magnetic film 215 is intended to serve as a flux concentrator to provide a sharp head field gradient so that narrow transitions in magnetic recording layer 250 can be written. As such, it is correspondingly desirable to have the transition region 230 in the soft magnetic film 215 ($TR_S$) as small as possible. In general, the width of the $TR_S$ 230 is proportional to the saturation magnetization (Ms) times the thickness (t) 217 of soft magnetic film 215 (Mst) and inversely proportional to the coercivity (Hc) of soft magnetic film 215 (the degree to which the magnet material resists being magnetized in the opposite direction).

Coercivity determines a film's ability to withstand demagnetizing fields and, thus, is important in achieving higher recording density. However, coercivity only describes the average behavior of all the crystals in a film during the length of time that a demagnetization field is applied to a film. Beyond controlling the average field at which magnetization switches, the configuration in which the grains of the film are magnetized may also be controlled. Magnetization reversal in a film may occur in conceptually different ways: (1) individual grains may undergo reversal independently; (2) local groups of grains, which are magnetostatically coupled to one another, may undergo reversal in unison; and (3) grains which are coupled over long distances from magnetic domains (and reversal occurs by movement of domain walls). More than one of these modes may be operative in a film.

Figure 3A:
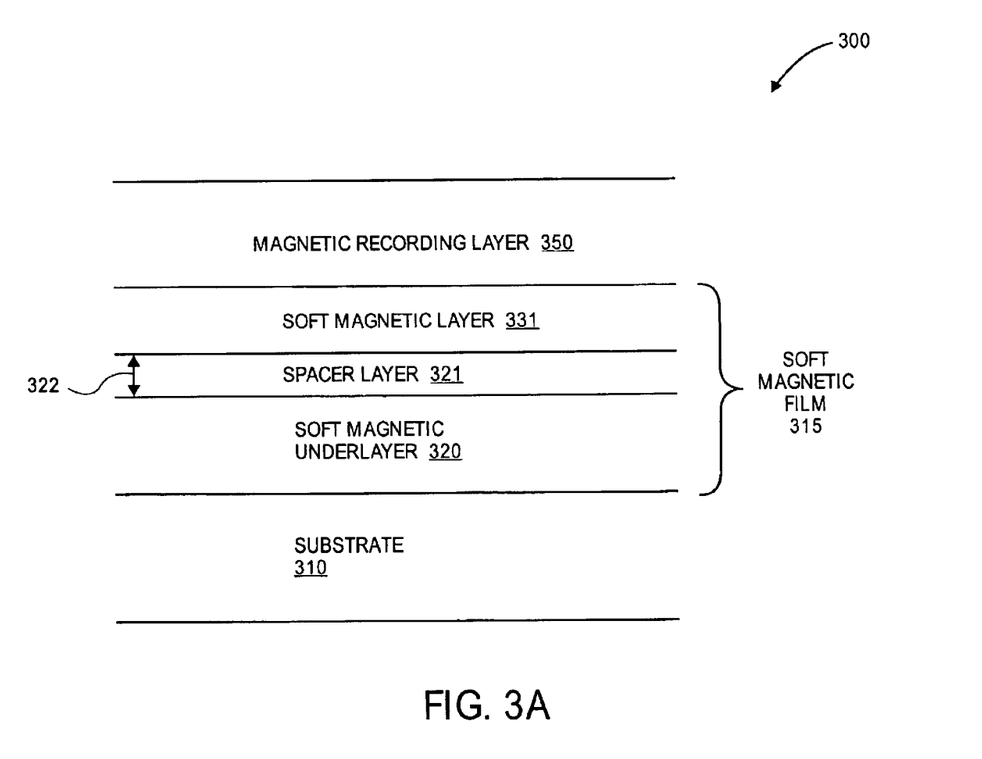
FIG. 3A illustrates one embodiment of a perpendicular magnetic recording disk.
Figure 3B:
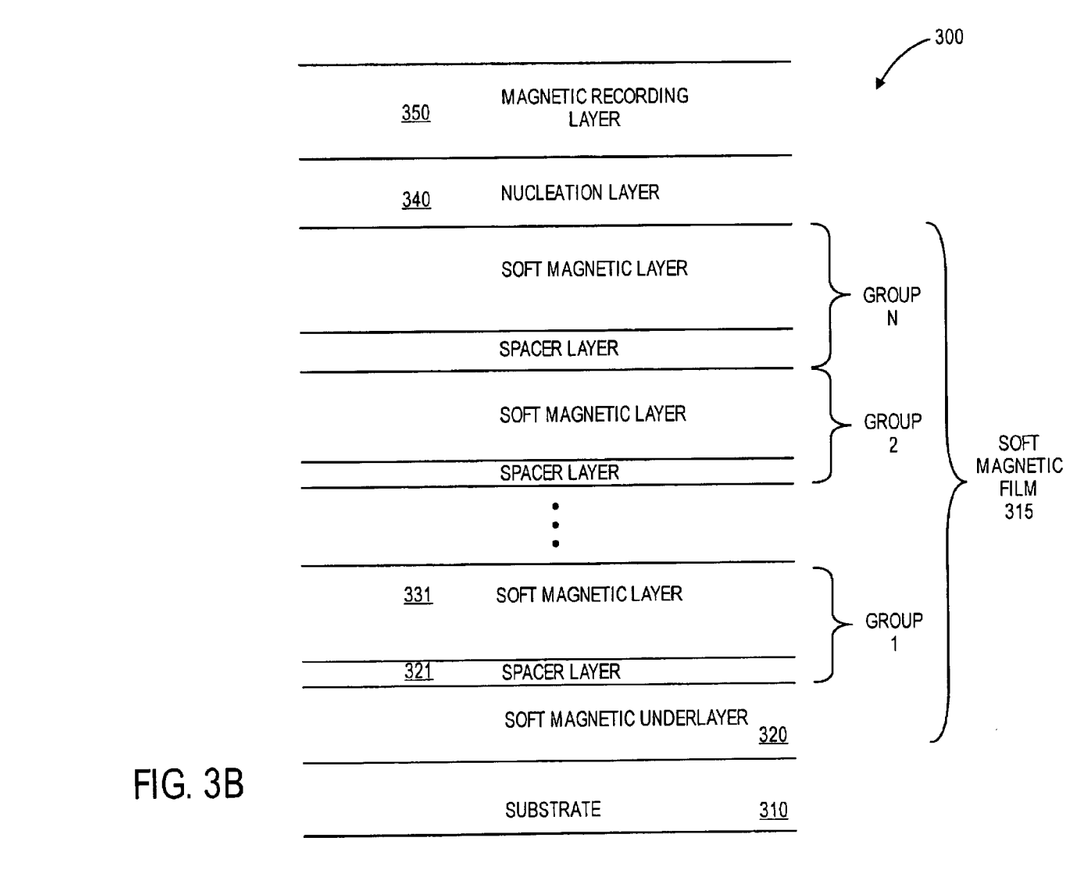
FIG. 3B illustrates an alternative embodiment of a perpendicular magnetic recording disk.

In addition to intergranular exchange coupling (likely to be present in a conventional SUL structure), individual magnetic grains in a soft magnetic layer are in close enough proximity to experience strong magnetostatic coupling. Either of these coupling mechanisms has the effect of causing groups of neighboring grains to act, more or less, in unison. The grains of the soft magnetic film 215 may be exchange decoupled through the use of a segregate as discussed below. It is believed that the addition of one or more non-magnetic spacer layers (e.g., of Ru or Re) to the soft magnetic film 215 residing beneath magnetic recording layer 250 (as illustrated in FIGS. 3A and 3B) operates to disrupt magnetostatic coupling by effectively reducing Mst because of the strong anti-ferromagnetic coupling induced in the soft magnetic film 215. The addition of such non-magnetic spacer layer(s) interspersed within soft magnetic film 215 may operate to, in effect, neutralize the magnetic domains in the soft magnetic film 215. Inter-granular exchange decoupling of the soft magnetic film's layers in combination with the spacer layers may operate to further neutralize the magnetic domains in the soft magnetic film 215. Previously, the magnetization transition in a soft magnetic film was limited to the typical domain wall width within the film. With neutralized magnetic domains in the soft magnetic film 215, the magnetization transition (e.g., 230) can be narrower. This in turn can provide sharper image fields and head field gradients to write narrower transitions in the perpendicular hard magnetic recording layer 250.

FIG. 3A illustrates one embodiment of a perpendicular magnetic recording disk. In one embodiment, perpendicular magnetic recording disk 300 includes a substrate 310, a soft magnetic film 315, and a hard magnetic recording layer 350. The above-mentioned layers (and the other layers discussed herein) may be formed on both sides of substrate 310 to form a double sided magnetic recording disk. However, only the layers on a single side of substrate 310 are shown for case of illustration. Alternatively, a single sided perpendicular magnetic recording disk may be formed.

Substrate 310 may be composed of, for examples, a glass material or a metal/metal alloy material. Glass substrates that may be used include, for example, a silica containing glass such as borosilicate glass and aluminosilicate glass. Metal and metal alloy substrates that may be used include, for examples, aluminum (Al) and aluminum magnesium (AlMg) substrates, respectively. In an alternative embodiment, other substrate materials such as polymers and ceramics may be used. Substrate 310 may also be plated with a nickel phosphorous (NiP) layer (not shown). The substrate surface (or the plated NiP surface) may be polished and/or textured.

Soft magnetic film 315 includes a soft magnetic underlayer 320, and a layer group disposed above it comprising a spacer layer 321 and another soft magnetic layer 331. In one embodiment, spacer layer 321 may be composed of Ru or a Ru alloy (e.g., composed essentially of Ru). Ru is an element that is nonmagnetic. Alternatively, other materials that induce anti-ferromagnetic coupling between soft magnetic layer 331 and soft magnetic underlayer 320 may be used for spacer layer 321, for example, Rhenium (Re).

Spacer layer 321 may have a thickness 322 in the range of approximately 4 to 10 Angstroms and, in one particular embodiment, approximately 8 Angstroms. Alternatively, spacer layer 321 may have a thickness 322 outside of the range given above. Spacer layer 321 may also help to magnetically decouple the separate columnar grains in the soft magnetic underlayers.

Soft magnetic layers 320 and 331 may be composed of, for example, an iron-cobalt-nickel (FeCoNi) alloy. Other materials that may be used for the soft magnetic underlayers include, for examples, cobalt-iron (CoFe), nickel-iron (NiFe), and alloys thereof. Soft magnetic underlayers and materials that may be used for manufacturing a soft magnetic underlayer are well known in the art of magnetic recording disks; accordingly, a detailed discussion is not provided. In one embodiment, the thickness of soft magnetic underlayer 320 is approximately in the range of 1000 to 1800 Angstroms and the thickness of soft magnetic layer 331 is approximately in the range of 50 to 100 Angstroms. Alternatively, soft magnetic layers 320 and 331 may have other thickness. It is estimated in perpendicular recording systems to scale the thickness of the SUL with the width of the writing pole of the head to satisfy a simple flux conservation requirement.

The grains of the soft magnetic film 315 may be exchange decoupled through the use of a segregate, for example, silicon dioxide ($SiO_2$) or boron in the soft magnetic underlayers. The segregate should be compatible with the soft magnetic underlayer material and should not substantially affect the intrinsic properties of the soft magnetic material. The soft magnetic film 315 having such a decoupled structure may exhibit less permeability and higher Hc than is typical of a conventional soft magnetic film. However, as long as the permeability is kept high enough (e.g. >20) and the coercivity, Hc low enough (e.g. <500 Oe), the soft magnetic film 315 can still act as an effective return path for the head flux and thus serve its intended purpose.

The hard magnetic recording layer 350 may be composed of, for examples, Co-alloys, Co/Pt based metallic multilayers or may be based on intermetallic compounds such as FePt L10. Alternatively, the hard magnetic recording layer 350 may be composed of multiple magnetic recordings layers and nonmagnetic layers. Magnetic recording layers are known in the art; accordingly a detailed discussion is not provided.

In an alternative embodiment, the soft magnetic film 315 may include multiple (N) groups of soft magnetic layers and spacer layers, as illustrated in FIG. 3B. Each layer group functions to counteract the magnetic effects of the group above it, as discussed below in relation to FIG. 4. The spacer layers may be uniformly distributed among the soft magnetic layers as illustrated in FIG. 3B. In one particular embodiment, the soft magnetic layers 331 may have different thickness, as discussed below in relation to FIG. 3C.

Figure 3C:
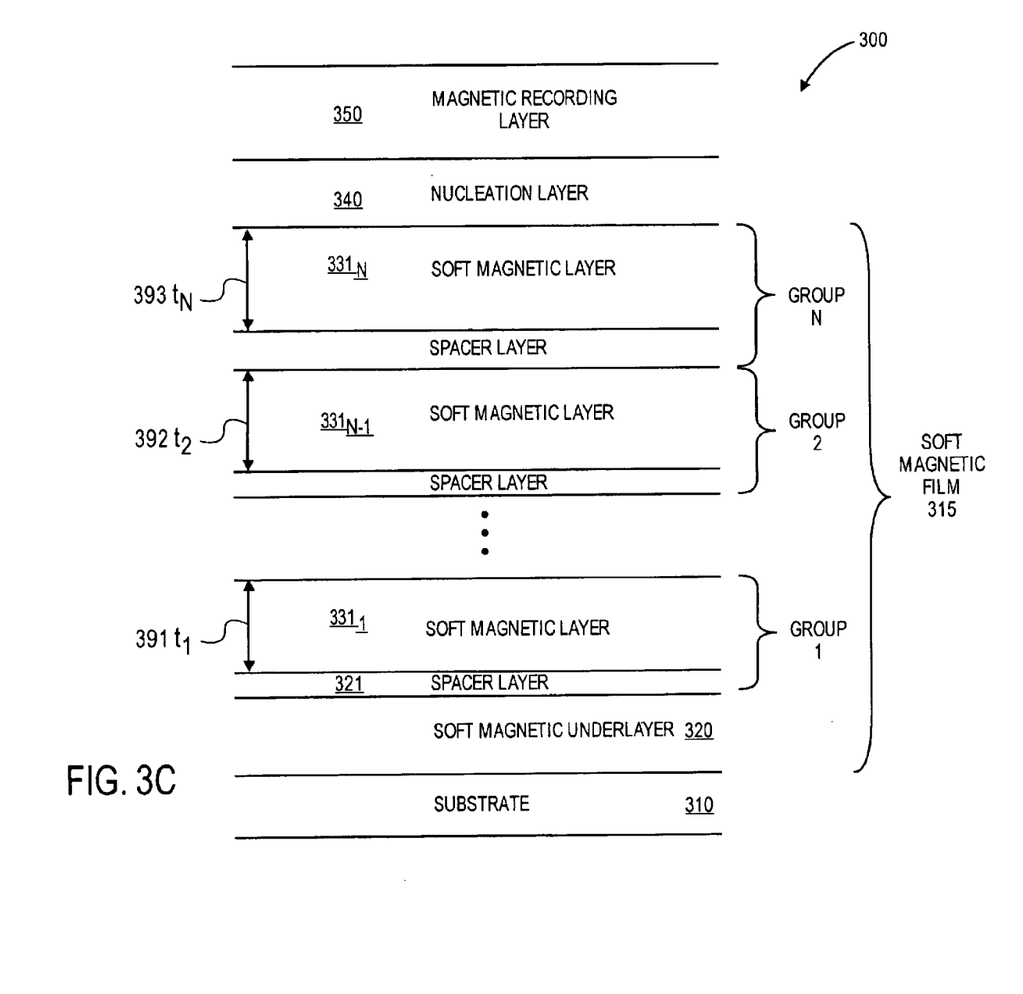
FIG. 3C illustrates the thickness of soft magnetic layers in an embodiment of a perpendicular magnetic recording disk.

FIG. 3C illustrates the thickness of soft magnetic layers in an embodiment of a perpendicular magnetic recording disk. One or more of the soft magnetic layers may have a different thickness than other soft magnetic layers. Each soft magnetic layer may have a thickness greater than the thickness of the soft magnetic layer residing above it. For example, the thickness $t_1$ 391 of soft magnetic layer $331_1$ is greater than the thickness $t_2$ 392 of soft magnetic layer $331_{N-1}$ and thickness $t_2$ 392 of soft magnetic layer $331_{N-1}$ is greater than thickness $t_N$ 393 of soft magnetic layer $331_N$. In one particular embodiment, each soft magnetic layer has a thickness in the range of approximately 10 to 15 percent thicker than the thickness of a soft magnetic layer immediately above it. Other thickness ratios among the soft magnetic layers may also be used. The soft magnetic layers may have thickness ratios selected to minimize the fringing field from a domain wall at a certain distance above the magnetic recording layer in order to minimize the signal of a soft magnetic film 315 transition region in a head flown over the magnetic recording disk.

Alternatively, each soft magnetic layer may have a thickness less than the thickness of the soft magnetic layer residing above it. In yet another embodiment, some soft magnetic layers may have greater thickness than above disposed layers while other have less thickness than above disposed layers.

Figure 4:
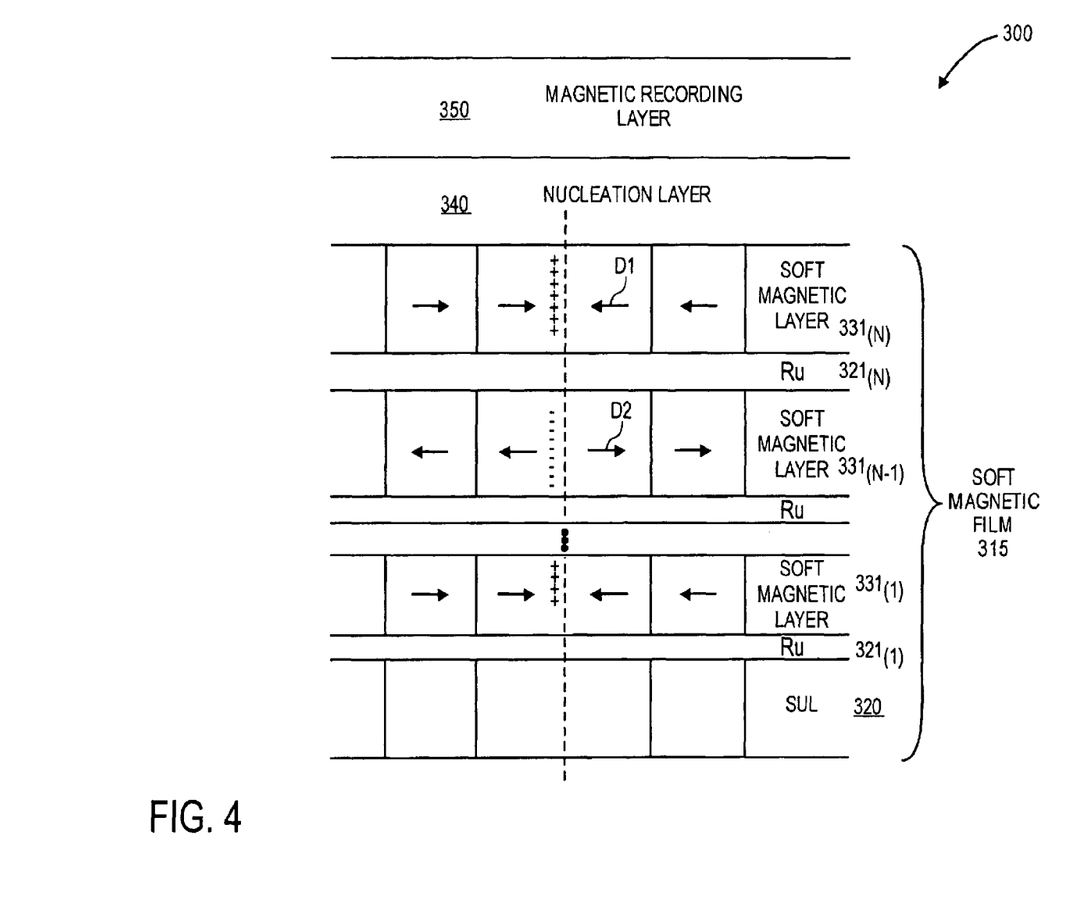
FIG. 4 illustrates the magnetic effects within one embodiment of a soft magnetic film.

FIG. 4 illustrates the magnetic effects in one embodiment of a soft magnetic film having spacer layer(s) and soft magnetic layers. In FIG. 4, the positive (+) signs indicate positive magnetic pole charges and the negative (−) signs indicate negative magnetic pole charges as they would develop in the presence of a domain wall transition given the magnetization state of the layers as indicated by the arrows within each layer. If the spacer layers $321_{(1\ to\ N)}$ have a thickness in a certain range as discussed above, the soft magnetic layers $331_{(1\ to\ N)}$ are anti-ferromagnetically coupled with each other and layer $331_1$ is anti-ferromagnetically coupled to layer 320, thereby creating an anti-ferromagnetic soft magnetic film 315. Because of the anti-ferromagnetic coupling between layers $331_{(1 \text{ to } N)}$ and soft magnetic underlayer 320, when a region within layer $331_{(N)}$ is magnetized in one direction (e.g., as shown by arrow D1), the magnetization direction of the beneath region of layer $331_{(N-1)}$ is in the opposite direction (e.g., as shown by arrow D2). The magnetization of the layers is characterized by a hysteresis loop. As one increases the applied magnetic field to medium 300, the layers $331_{(1 \text{ to } N)}$ are magnetized in the same direction as the applied magnetic field. As the applied magnetic field is reduced past a certain point, the magnetization of a layer 331 begins to switch directions into an antiferromagnetic state with respect to adjacent 331 layers. Strong anti-ferromagnetic coupling among layers $331_{(1 \text{ to } N)}$, decreases the amount of time required to switch the state of medium 300. The magnetic recording medium 300 relies in part on thermal energy to switch magnetization directions of the layers to its lower energy configuration.

The anti-ferromagnetic structure in the SUL can be designed in such a way as to minimize the amount of field projected to the read head, effectively making any transition present in the SUL, e.g., such as that from the presence of a domain wall, to appear significantly further away than it actually is from the surface of the media thus minimizing its deleterious effects on the noise characteristics of the system.

In addition, the granularity of the soft magnetic layers $331_{(N)}$ can help sustain sharper magnetic transitions and result in more responsiveness to the high density magnetic pole variations on the bottom of the magnetic recording layer 350 by the magnetization in the soft magnetic film 315 adjusting itself to cancel the fields arising from such a magnetization pattern in the recording layer.

Referring again to FIG. 3B, one or more additional layers may also be disposed between substrate 310 and magnetic recording layer 350, for example, a nucleation layer 340. Nucleation layer 340 may be used to facilitate a certain crystallographic growth within the magnetic recording layer 350. A structured nucleation layer in addition to the underlayer(s) may provide for a finer crystalline structure of the magnetic recording layer 350. The structure nucleation layer 350 may include multiple intermediate layers providing, for example, for epitaxial growth of subsequently deposited magnetic recording layer 350. A nucleation layer, whether implemented as a nucleating underlayer or an intermediate layer, controls the morphology and grain orientation of subsequent layers. Specifically, a nucleation layer controls grain size, grain spacing, grain orientation and c-axis of the grains of subsequently deposited layers and the magnetic recording layer 350. The nucleation layer 340 material may be selected based on its crystal structure and relatively close lattice match for certain lattice planes to the selected magnetic layer material. To function best as a perpendicular recording layer, the material of the magnetic recording layer 350 (e.g., cobalt or cobalt alloy) should have the c-axis of the granular structures disposed perpendicular to the substrate plane. As such, nucleation layer 340 may be used to facilitate a crystal direction in magnetic recording layer 350 that is perpendicular to the film plane. Nucleation layers are known in the art; accordingly, a detailed discussion is not provided. Additional layers, for other examples, may also include other intermediate layer(s) between soft magnetic film 315 and magnetic recording layer 350 and a seed layer(s) beneath soft magnetic underlayer 320.

Disk 300 may also include one or more layers (not shown) on top of the magnetic recording layer 350. For example, a protection layer may be deposited on top of the magnetic recording layer 350 to provide sufficient property to meet tribological requirements such as contact-start-stop (CSS) and corrosion protection. Predominant materials for the protection layer are carbon-based materials, such as hydrogenated or nitrogenated carbon. A lubricant may be placed (e.g., by dip coating, spin coating, etc.) on top of the protection layer to further improve tribological performance, for example, a perfluoropolyether or phosphazene lubricant. Protection and lubrication layers are known in the art; accordingly, a detailed discussion is not provided.

Figure 6:
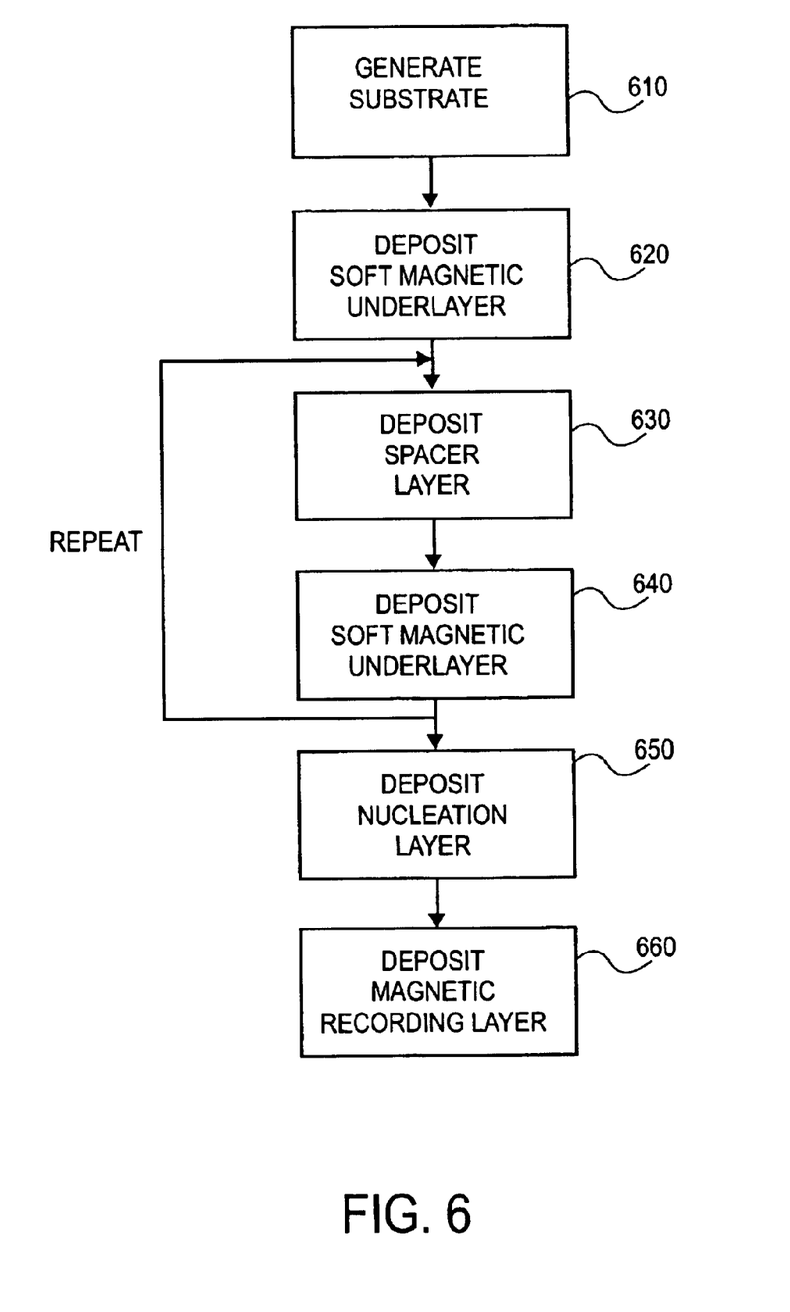
FIG. 6 illustrates one embodiment of a method of manufacturing a perpendicular magnetic recording disk.

FIG. 6 illustrates one embodiment of a method of manufacturing perpendicular magnetic recording disk 300. A substrate 310 is generated in step 610. The generation of a substrate for a magnetic recording disk is known in the art; accordingly a detailed discussion is not provided. In one embodiment, the substrate 310 may be plated (e.g., with NiP) and may also be polished and/or textured prior to subsequent deposition of layers. In step 620, a soft magnetic underlayer 320 is deposited above substrate 310. Then, a spacer layer (e.g., of Ruthenium) 321 is deposited above soft magnetic underlayer 320, step 630, followed by soft magnetic layer 331, step 640. Steps 630 and 640 may be repeated as desired to generate the N groups of soft magnetic layers 331 and spacer layers 321 discussed above.

In one embodiment, a nucleation layer is then deposited above the N groups of soft magnetic layers 331 and spacer layers 321, step 650. A magnetic recording layer 350 is deposited above the nucleation layer 340 or, alternatively, if no nucleation layer 340 is present, above the N groups of soft magnetic layers 331 and spacer layers 321, step 660. Additional layers may be deposited above the magnetic recording layer 350 as discussed above.

Deposition of the spacer layer(s), the soft magnetic underlayer/layers, the nucleation layer, the magnetic recording layer, and the protection layer above the substrate can be accomplished by a variety of methods known in the art, such as, for examples, sputtering, chemical vapor deposition (CVD), ion-beam deposition (IBD), etc.

Figure 5:
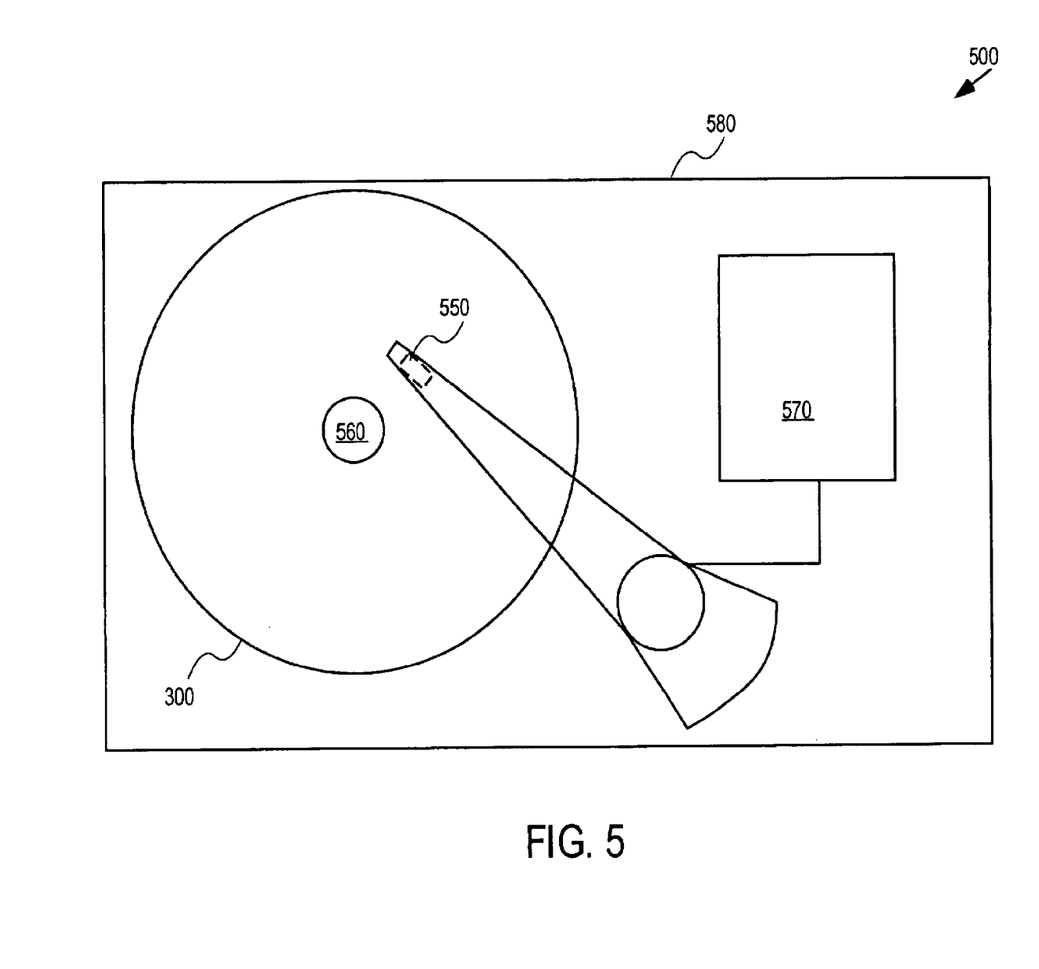
FIG. 5 illustrates one embodiment of a disk drive system having a perpendicular magnetic recording disk.

FIG. 5 illustrates a disk drive having disk 300. Disk drive 500 may include one or more disks 300 to store datum. Disk 300 resides on a spindle assembly 560 that is mounted to drive housing 580. Data maybe stored along tracks in the magnetic recording layer 350 of disk 300. The reading and writing of data is accomplished with head 550 that has both read and write elements. The write element is used to alter the properties of the perpendicular magnetic recording layer 350 of disk 300. In one embodiment, head 550 may have a magneto-resistive (MR) and, in particular, a giant magneto-resistive (GMR) read element and an inductive write element. In an alternative embodiment, head 550 may be another type of head, for example, an inductive read/write head or a hall effect head. A spindle motor (not shown) rotates spindle assembly 560 and, thereby, disk 300 to position head 550 at a particular location along a desired disk track. The position of head 550 relative to disk 300 may be controlled by position control circuitry 570. The use of disk 300 fabricated in the manners discussed may render the perpendicular magnetic recording layer 350 of disk 300 less prone to noise from the soft magnetic film 315. The soft magnetic film 315 operates to minimize the signal of a soft magnetic film domain transitions in the reader of head 550. Domain transitions appear effectively far away from the head 550 such that the magnetic field projected by the soft magnetic film 315 on the head 550 is minimized.

In the foregoing specification, the invention has been described with reference to specific exemplary embodiments thereof. It will, however, be evident that various modifications and changes may be made thereto without departing from the broader spirit and scope of the invention as set for in the appended claims. The specification and drawings are, accordingly, to be regarded in an illustrative rather than a restrictive sense.

What is claimed is:

1. A perpendicular magnetic recording disk, comprising:
   a substrate;
   a magnetic recording layer; and
   a soft magnetic film disposed between the substrate and the magnetic recording layer, wherein the soft magnetic film comprises:
      a plurality of layer groups, each of the plurality of layer groups having a first ferromagnetic layer and a non-magnetic spacer layer, the first ferromagnetic layer being disposed adjacent to the non-magnetic spacer layer in each layer group; and
      a second ferromagnetic layer, wherein one of the non-magnetic spacer layers is disposed between one of the first ferromagnetic layers and the second ferromagnetic layer being configured to induce antiferromagnetic coupling therebetween, and wherein the first ferromagnetic layer of each layer group has a thickness greater than the thickness of the first ferromagnetic layer of the layer group residing above it.

2. The perpendicular magnetic recording disk of claim 1, wherein the non-magnetic spacer layer in at least one of the plurality of layer groups comprises ruthenium.

3. The perpendicular magnetic recording disk of claim 1, wherein the non-magnetic spacer layer in at least one of the plurality of layer groups has a thickness approximately in the range of 4 to 15 Angstroms.

4. The perpendicular magnetic recording disk of claim 1, wherein the thickness of the non-magnetic spacer layer in at least one of the plurality of layer groups is approximately 8 Angstroms.

5. The perpendicular magnetic recording disk of claim 1, wherein the first ferromagnetic layer in at least one of the plurality of layer groups comprises a segregate.

6. The perpendicular magnetic recording disk of claim 1, wherein the non-magnetic spacer layer in each of the plurality of layer groups comprises ruthenium.

7. The perpendicular magnetic recording disk of claim 1, wherein the non-magnetic spacer layer in each of the plurality of layer groups has a thickness approximately in the range of 4 to 15 Angstroms.

8. The perpendicular magnetic recording disk of claim 1, wherein the first ferromagnetic layer of each layer group has a thickness in the range of approximately 10 to 15 percent thicker than the first ferromagnetic layer of the layer group immediately above it.

9. The perpendicular magnetic recording disk of claim 1, wherein a thickness of at least one of the first ferromagnetic layers is approximately in the range of 20–100 Angstroms.

10. The perpendicular magnetic recording disk of claim 1, wherein the second ferromagnetic layer comprises a segregate.

11. The perpendicular magnetic recording disk of claim 10, wherein the segregate is $SiO_2$.

12. A method for producing a perpendicular magnetic recording disk, comprising:
   depositing a first soft magnetic layer above a substrate;
   depositing a first spacer layer above the first soft magnetic layer;
   depositing a second soft magnetic layer above the spacer layer;
   depositing a second spacer layer above the second soft magnetic layer; and
   depositing a third soft magnetic layer above the second spacer layer, wherein the magnetic recording layer is disposed above the third soft magnetic layer, and wherein each of the first, second, and third soft magnetic layers has a thickness greater than the thickness of the soft magnetic layer residing above it; and
   depositing a magnetic recording layer above the third soft magnetic layer.

13. The method of claim 12, further comprising adding a segregate to at least one of the first, second, and third soft magnetic layers.

14. The method of claim 12, wherein the first spacer layer comprises ruthenium.

15. The method of claim 12, wherein the first and second spacer layers comprise ruthenium.

16. The method of claim 13, wherein the segregate is $SiO_2$.

17. The perpendicular magnetic recording disk of claim 12, further comprising means for granularly decoupling each of the soft magnetic layers.

18. A disk drive, comprising:
   a head having a magnet-resistive read element; and
   a magnetic recording disk operatively coupled to the head, wherein the magnetic recording disk comprises:
      a substrate;
      a magnetic recording layer; and
      a soft magnetic film disposed between the substrate and the magnetic recording layer, wherein the soft magnetic film comprises:
         a plurality of layer groups, each of the plurality of layer groups having a first ferromagnetic layer and a spacer layer, the first ferromagnetic layer being disposed adjacent to the spacer layer in each layer group; and
         a second ferromagnetic layer, wherein one of the spacer layers is disposed between one of the first ferromagnetic layers and the second ferromagnetic layer being configured to induce antiferromagnetic coupling therebetween, and wherein the first ferromagnetic layer of each layer group has a thickness greater than the thickness of the first ferromagnetic layer of the layer group residing above it.

19. The disk drive of claim 18, wherein the spacer layer in at least one of the plurality of layer groups comprises ruthenium.

20. The disk drive of claim 18, wherein a thickness of at least one of the spacer layers is approximately in the range of 4 to 15 Angstroms.

21. The disk drive of claim 18, wherein the first ferromagnetic layer in at least one of the plurality of layer groups is composed of a material having a segregate.

22. The disk drive of claim 21, wherein the segregate is $SiO_2$.

* * * * *